(12) United States Patent
Yamaguchi et al.

(10) Patent No.: US 9,199,317 B2
(45) Date of Patent: Dec. 1, 2015

(54) SCROLL MACHINING METHOD AND MACHINING UNIT

(75) Inventors: Mitsuhiro Yamaguchi, Kanagawa (JP); Junichi Maeda, Kanagawa (JP)

(73) Assignee: Makino Milling Machine Co., Ltd., Tokyo (JP)

(*) Notice: Subject to any disclaimer, the term of this patent is extended or adjusted under 35 U.S.C. 154(b) by 298 days.

(21) Appl. No.: 13/820,582

(22) PCT Filed: Sep. 7, 2010

(86) PCT No.: PCT/JP2010/065685
§ 371 (c)(1),
(2), (4) Date: Mar. 4, 2013

(87) PCT Pub. No.: WO2012/032667
PCT Pub. Date: Mar. 15, 2012

(65) Prior Publication Data
US 2013/0156523 A1    Jun. 20, 2013

(51) Int. Cl.
*B23C 3/04* (2006.01)
*B23C 3/32* (2006.01)
(Continued)

(52) U.S. Cl.
CPC ... *B23C 3/32* (2013.01); *B23C 3/34* (2013.01); *B23C 1/14* (2013.01); *B23C 3/02* (2013.01); *B23C 3/04* (2013.01); *B23C 3/18* (2013.01); *B23C 2220/363* (2013.01); *Y10T 409/30756* (2015.01); *Y10T 409/303808* (2015.01); *Y10T 409/305712* (2015.01); *Y10T 409/307448* (2015.01)

(58) Field of Classification Search
CPC .............. B23C 1/14; B23C 1/18; B23C 3/02; B23C 3/04; B23C 3/16; B23C 3/18; B23C 2220/363
USPC .......... 409/131, 132, 142, 165, 166, 167, 199
See application file for complete search history.

(56) References Cited

U.S. PATENT DOCUMENTS 4,893,971 A * 1/1990 Watanabe et al. ............... 409/80
5,103,558 A * 4/1992 Herrick et al. ........... 29/888.022
(Continued)

FOREIGN PATENT DOCUMENTS

CN    1345648 A    4/2002
CN    1697716 A    11/2005
(Continued)

OTHER PUBLICATIONS

Machine translation of JP 11-090773, printed Jan. 2015.*

*Primary Examiner* — Daniel Howell
*Assistant Examiner* — Yasir Diab
(74) *Attorney, Agent, or Firm* — Paul & Paul

(57) ABSTRACT

A scroll machining method for forming a wall part (21) configured in a scroll shape on a surface of a workpiece (W), which includes a first scroll machining step of machining one of the wall surfaces (22, 23), in which a tool (14) is moved relative to the workpiece from an outside of the workpiece (W) toward a center part (25) along a predetermined path (L1) while turning the rotary table (17) in a first direction (R1); and a second scroll machining step of machining the other of the wall surfaces (22, 23), in which the tool (14) is moved relative to the workpiece from the center part (25) of the workpiece (W) toward the outside by returning along the predetermined path (L1) while turning the rotary table (17) in a second direction (R2) opposite to the first direction (R1).

5 Claims, 9 Drawing Sheets

(51) Int. Cl.
*B23C 3/34* (2006.01)
*B23C 3/02* (2006.01)
*B23C 3/18* (2006.01)
*B23C 1/14* (2006.01)

(56) References Cited

U.S. PATENT DOCUMENTS

| | | | |
|---|---|---|---|
| 5,564,185 A * | 10/1996 | Saeki et al. | 29/888.022 |
| 5,580,198 A | 12/1996 | Saeki et al. | |
| 5,581,880 A * | 12/1996 | Iio et al. | 29/888.022 |
| 5,630,684 A * | 5/1997 | Yamaguchi et al. | 409/132 |

FOREIGN PATENT DOCUMENTS

| | | |
|---|---|---|
| EP | 2172294 A1 | 4/2010 |
| JP | 04-171111 A | 6/1992 |
| JP | 07-051916 A | 2/1995 |
| JP | 08-185211 A | 7/1996 |
| JP | 11-09073 A | 4/1999 |
| JP | 2002144128 A | 5/2002 |
| JP | 2005-090514 A | 4/2005 |
| KR | 10-0310814 A | 12/2001 |
| WO | WO 8908522 A1 * | 9/1989 |

* cited by examiner

SCROLL MACHINING METHOD AND MACHINING UNIT

TECHNICAL FIELD

The present invention relates to a scroll machining method and machining unit for machining a scroll shaped wall part.

BACKGROUND ART

Conventionally, there is a known machining method, which includes attaching a workpiece to a rotary table on an XY plane and moving a tool relative to the workpiece parallel to the X-axis while turning the workpiece to form an involute curve shaped wall part at the workpiece (for example, see Patent Literature 1). In this method described in Patent Literature 1, the tool is offset in the Y-axis direction by the amount of the radius of the base circle of the involute curve. In that state, the tool is moved toward a center part of the workpiece substantially in parallel to the X-axis to machine an inside wall surface of the wall part. After that, the tool is offset to the opposite side in the Y-axis direction by the amount of the radius of the base circle of the involute curve. In that state, the tool is moved from the center part of the workpiece in parallel to the X-axis to machine the outside wall surface of the wall part. That is, in the method described in Patent Literature 1, in the XY quadrants about the center of the workpiece as an origin, the inside wall surface is machined in one quadrant and the outside wall surface is machined in the other quadrant at the opposite side to that one quadrant across the center of the workpiece.

In this regard, in a machining unit for carrying out this type of machining method, usually when aligning the center of the tool with the center of the rotary table, off-centering of at least about several μm or so occurs between the two. Therefore, this off-centering causes the machining positions of the inside wall surface and the outside wall surface of the wall part to deviate from the design values and makes it difficult to precisely machine the thickness of the wall part between the inside wall surface and the outside wall surface.

In particular, when, like in the method described in the above-mentioned Patent Literature 1, when the inside wall surface is machined in one quadrant and the outside wall surface is machined in the other quadrant at the opposite side to that one quadrant, the deviations in machining positions of the inside wall surface and the outside wall surface are added to the thickness of the wall part and the thickness of the wall part greatly deviates from the design value.

CITATIONS LIST

Patent Literature 1
Japanese Unexamined Patent Publication No. 2002-144128 A1

SUMMARY OF INVENTION

According to an aspect of the present invention, a scroll machining method for forming a wall part configured in a scroll shape on a surface of the workpiece, in which a tool attached to a spindle is moved relative to the workpiece attached to a rotary table, includes a first scroll machining step of machining one of an outside wall surface and an inside wall surface of the wall part, in which the tool is moved relative to the workpiece from an outside of the workpiece toward a center part along a predetermined path while turning the rotary table in a first direction, and a second scroll machining step of machining the other of the outside wall surface and the inside wall surface of the wall part, in which the tool is moved relative to the workpiece from the center part of the workpiece toward the outside by returning along the predetermined path while turning the rotary table in a second direction opposite to the first direction.

Further, according to another aspect of the present invention, a machining unit includes a first driving portion turning a rotary table to which a workpiece is attached, a second driving portion moving a tool attached to a spindle relative to the rotary table, and a control portion controlling the first driving portion and the second driving portion, so that when one of an outside wall surface and an inside wall surface of a wall part configured in a scroll shape is machined, the tool is moved relative to the workpiece from an outside of the workpiece toward a center part along a predetermined path while the rotary table turns in a first direction and so that when the other of the outside wall surface and the inside wall surface of the wall part is machined, the tool is moved relative to the workpiece from the center part of the workpiece toward the outside by returning along the predetermined path while the rotary table turns in a second direction opposite to the first direction.

DESCRIPTION OF EMBODIMENTS

Figure 1:
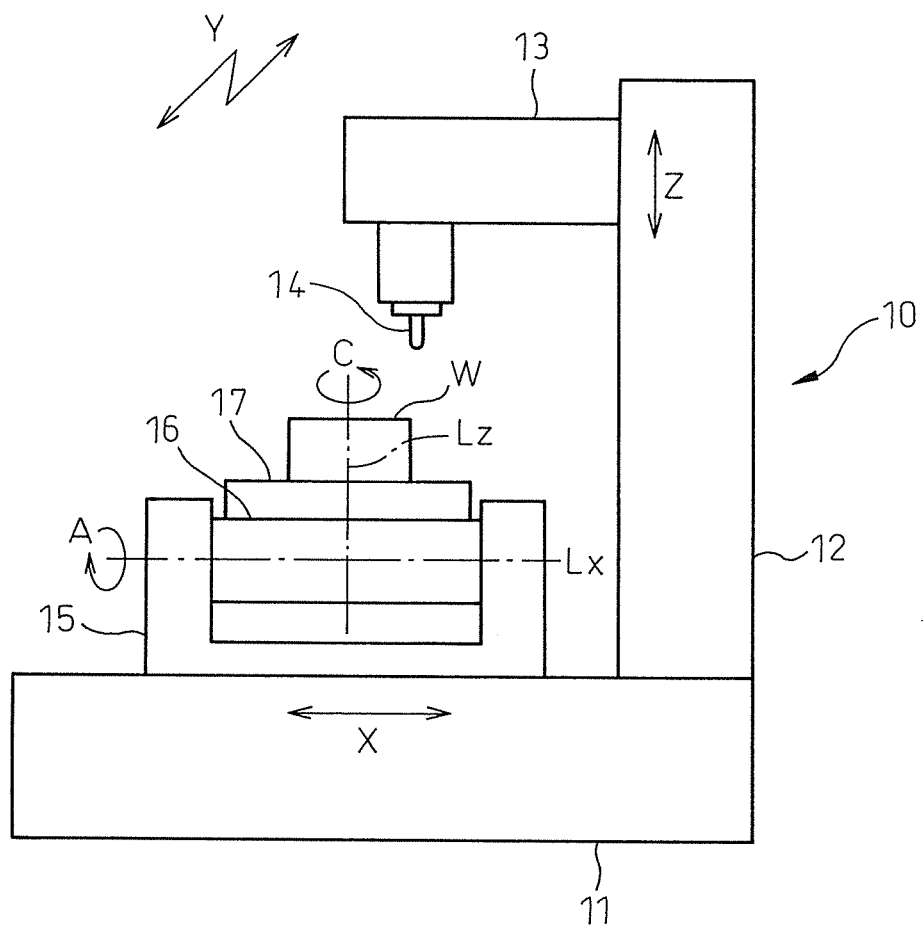
FIG. 1 is a side view showing the schematic configuration of a machine tool for forming a scroll shape by a scroll machining method according to an embodiment of the present invention.

Below, referring to FIG. 1 to FIG. 12, an embodiment of a scroll machining method according to the present invention will be explained. FIG. 1 is a side view which shows the schematic configuration of a machine tool 10 for machining a scroll shape at a workpiece W by using the scroll machining method according to an embodiment of the present invention. As the machine tool 10, for example, a 5-axis vertical type machining center is used.

In FIG. 1, a column 12 is erected on a bed 11. At the column 12, a spindle head 13 is supported movably in the up-down direction (Z-axis direction) and horizontal direction (Y-axis direction) through a linear feed mechanism. At the spindle head 13, a cutting tool 14 is attached facing downward via a spindle. The tool 14 is, for example, an end mill and is driven to rotate by a spindle motor inside of the spindle head 13. On the bed 11, a table base 15 is supported movably in the horizontal direction (X-axis direction) through a linear feed mechanism. The linear feed mechanism is, for example, comprised of a ball screw and a servo motor which drives rotation of the ball screw.

To the table base 15, a tilting table 16 is attached swingably in an A-axis direction about an axis of rotation Lx in the X-axis direction through a rotation feed mechanism. To the tilting table 16, a rotary table 17 is attached rotatably in a C-axis direction about an axis of rotation Lz in the Z-axis direction through a rotation feed mechanism. On the rotary table 17, a workpiece W is fastened with a workpiece fastening fixture. The rotation feed mechanism is, for example, comprised of a direct drive motor or servo motor.

In the above configuration of the machine tool 10, the spindle motor inside the spindle head 13 is referred to as a "spindle motor", the motors for moving the spindle head 13 in the Z-axis direction and Y-axis direction are referred to as a "Z-axis motor" and a "Y-axis motor", the motor for moving the table base 15 in the X-axis direction is referred to as a "X-axis motor", and the motor turning the rotary table 17 in the C-axis direction is referred to as a "C-axis motor".

According to such a configuration of the machine tool 10, the tool 14 and the workpiece W can move relatively in the 3-axial directions of the coordinate system (X-, Y-, Z-directions) and the workpiece W can turn in the C-axis direction. For this reason, by setting the tool 14 at a predetermined position in the vertical direction with respect to the workpiece W and, in that state, moving the tool 14 relative to the workpiece W in the horizontal direction while turning the workpiece W in the C-axis direction, a scroll shape with a predetermined depth can be processed on the workpiece surface and a designed scrolled object can be obtained.

Figure 2:
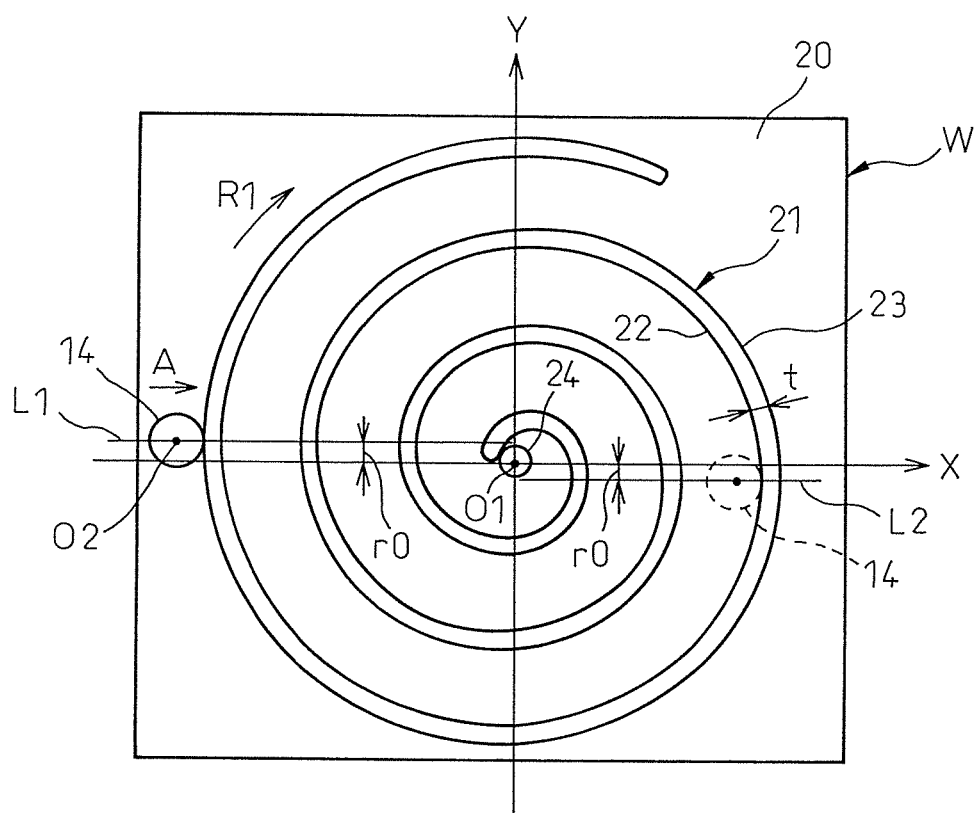
FIG. 2 is a plan view of a workpiece showing an example of a scroll shape.

FIG. 2 is a plan view of the workpiece W which shows an example of the scroll shape processed on the surface of the workpiece. In the figure, the scroll shape is shown on an XY plane having the center of the workpiece as its origin O1. The workpiece W is, for example, a component of a compressor. On a base part 20, a scroll shaped wall part 21 is provided in a protruding manner. A flow path is formed along the wall part 21. The shape of the base part 20 may be any of a circle, triangle, rectangle, etc. The inside wall surface 22 and the outside wall surface 23 of the wall part 21 are defined by an involute curve which has a base circle 24 of a radius r0. The thickness "t" of the wall part 21 is constant along the involute curve.

The inside wall surface 22 and the outside wall surface 23 of the wall part 21 are provided in advance with parts for being machined. These parts are cut by the tool 14 whereby the final shape of the scrolled object is formed. When machining a scroll on the workpiece W, first, the workpiece W is set onto the rotary table 17 so that the workpiece center (center O1 of base circle 24) is aligned with the center of rotation of the rotary table 17. After that, according to a predetermined machining program, the tool 14 is moved relatively along a line L1 tangent to the base circle 24 about O1 while turning the workpiece W about the C-axis. At that time, that rotation amount θ of the workpiece W and the feed amount X in the X-axis direction of the tool 14 are made to change by a constant ratio by synchronizing the rotation amount θ and the feed amount X. Due to this, it is possible to streamline the configuration of the machining program and to machine the scroll shape at a high speed and high precision.

For example, as shown in FIG. 2, it is assumed that the tool 14 is moved relatively from the outside of the workpiece W to an arrow A direction (+X-axis direction) along the line L1 while turning the workpiece W in the R1 direction, so as to machine the outside wall surface 23. After this machining of the outside wall surface 23, in order to machine the inside wall surface 22 while leaving the rotation direction of the workpiece W about the C-axis as the R1, as shown by the broken line in the figure, it is necessary to offset the tool 14 to the opposite side of the Y-axis direction of the center of rotation O1 by the amount of the radius r0 of the base circle 24 and move relatively the tool 14 to the +X-axis direction along the line L2 tangent to the base circle 24. In this case, the outside wall surface 23 is machined in the second quadrant of the XY plane, while the inside wall surface 22 is machined in the fourth quadrant of the XY plane.

Figure 3:
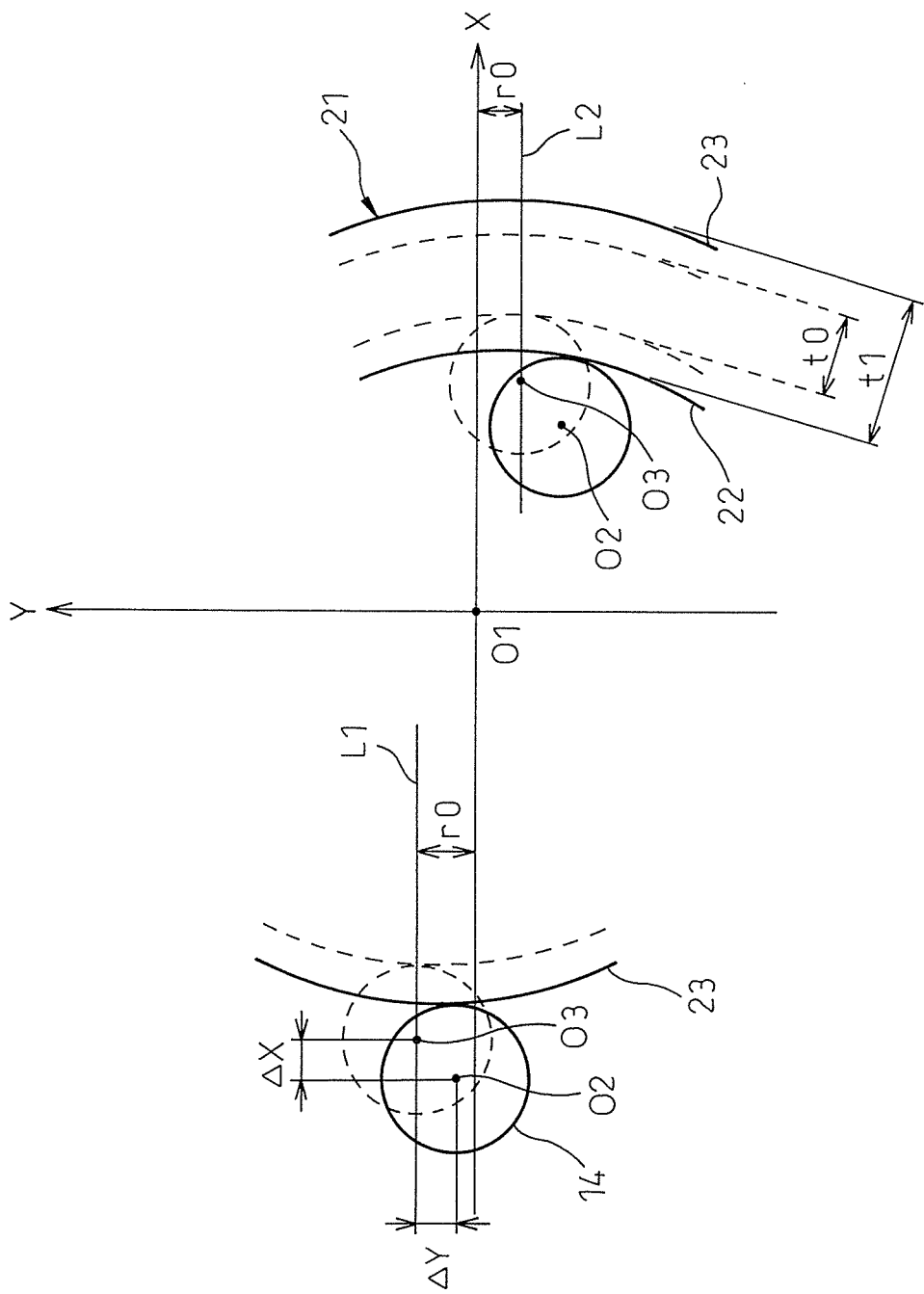
FIG. 3 is a view for explaining problems to be solved by the present invention.

In this regard, in the machining unit for carrying out this type of machining method, usually, when aligning the center O2 of the tool 14 with the center of the rotary table 17, off-centering of at least about several μm occurs between the two. That is, in FIG. 3, if the center (design value) of the tool 14 in the case of no off-centering is O3, the actual tool center O2 is, for example, offset in the X-axis direction by $\Delta X$ and in the Y-axis direction by $\Delta Y$. In this state, if machining the outside wall surface 23 of the workpiece W at the left region of the figure from the workpiece center of rotation O1 (second quadrant), the position of the outside wall surface 23, as shown by the solid line in FIG. 3, is offset from the design value (broken line) for example to the left side, that is, in the direction where the thickness of the wall part 21 increases.

At this time, if making the rotational direction about the C-axis of the workpiece W constant and machining the inside wall surface 22 at the right region of the figure (fourth quadrant), the position of the inside wall surface 22 (solid line) is offset from the design value (broken line) to the left side, that is, in the direction where the thickness of the wall part 21 increases. For this reason, the positional deviations of the outside wall surface 23 and the inside wall surface 22 directly become error in thickness of the wall part 21 and the actual thickness t1 (solid line) of the wall part 21 deviates from the design value t0 (broken line). If, in this way, the thickness t1 of the wall part 21 deviates from the design value t0, it is not possible to obtain the desired flow of fluid along the scroll shape and if using the workpiece W as a component of a compressor, the compressor performance is liable to be remarkably impaired.

Therefore, in the present embodiment, the machining unit is configured as follows so that even when there is off-centering of the tool 14, the thickness t1 of the wall part 21 is substantially equal to the design value t0.

Figure 4:
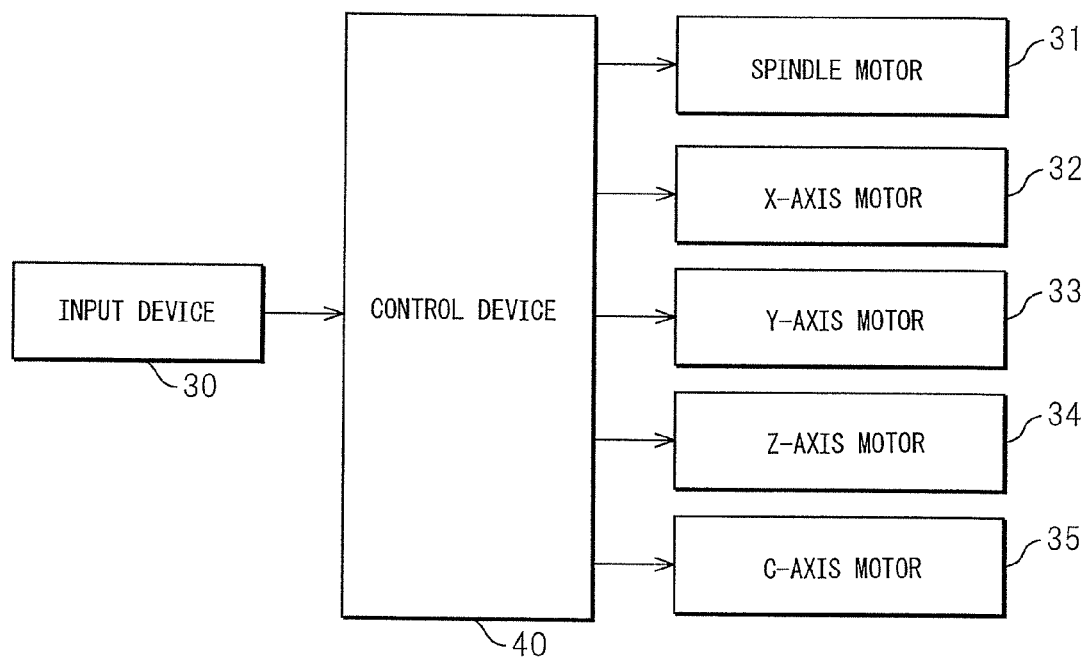
FIG. 4 is a block diagram which shows the configuration of a machining unit according to an embodiment of the present invention.

FIG. 4 is a block diagram which shows the configuration of a machining unit according to an embodiment of the present invention. This machining unit is provided with an input device 30 which inputs various types of information for machining a scroll at the workpiece W and a control device 40 which controls the spindle motor 31, X-axis motor 32, Y-axis motor 33, Z-axis motor 34, and C-axis motor 35 set in the machine tool 10 based on signals from the input device 30.

The input device 30 is comprised by an operating panel or keyboard, various reading devices which read signals from the outside, etc. By the input device 30, parameters which define the scroll shape (for example, the radius r0 of the base circle of the involute curve etc.), the depth of the wall part 21, the tool size, the machining start command, etc., are input.

The control device 40 is comprised of a processing system which has a CPU, ROM, RAM, and other peripheral circuits etc. The control device 40 runs a machining program which is determined in accordance with input signals from the input device 30 and controls the drive of the various motors 31 to 35 of the machine tool 10.

Figure 5:
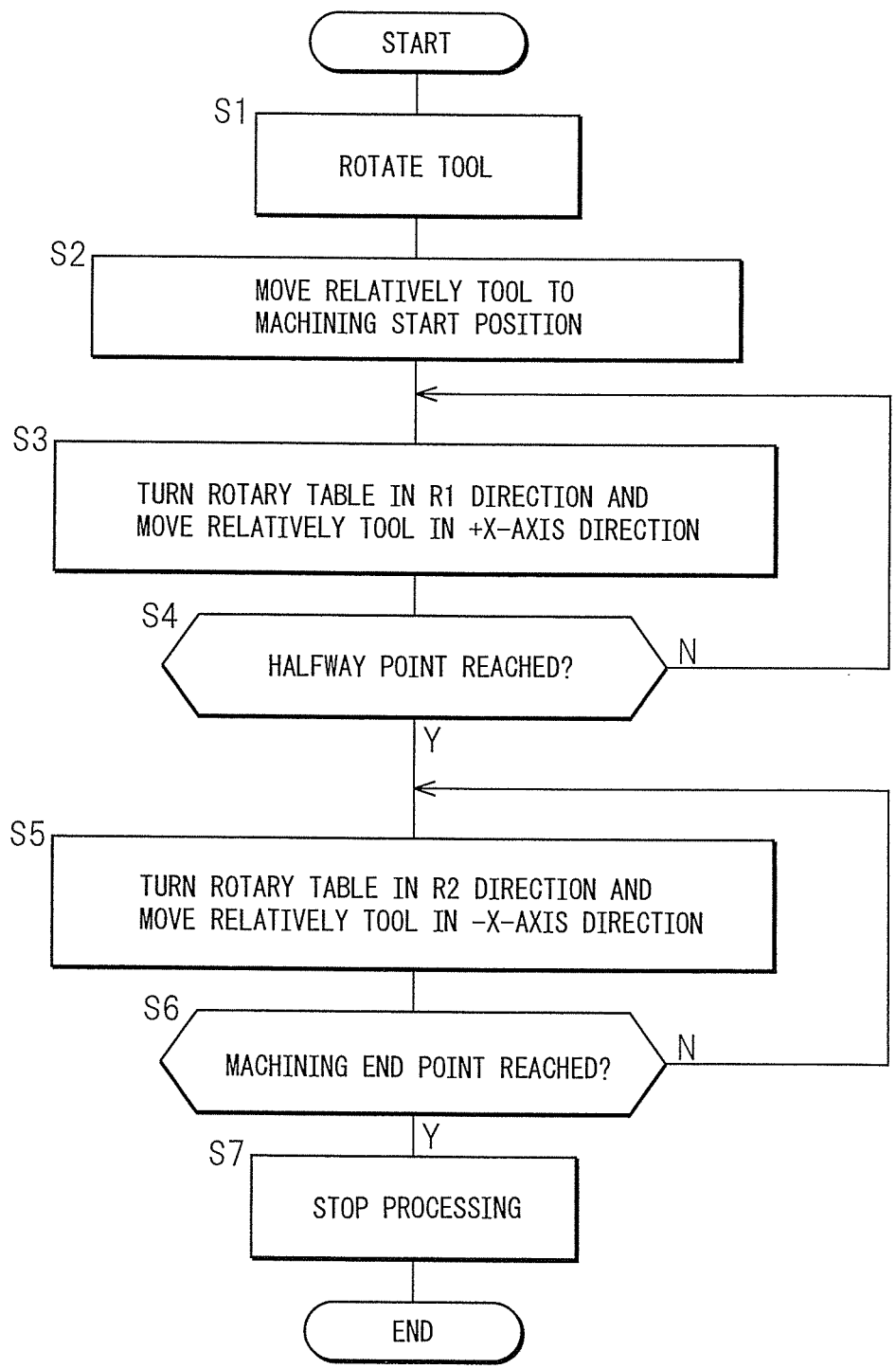
FIG. 5 is a flow chart showing an example of processing carried out by the control device of FIG. 4.

FIG. 5 is a flow chart which shows an example of the scroll machining process run by the control device 40. The process shown in this flow chart is started after fastening the workpiece W on the rotary table 17 so that the workpiece center O1 is aligned with the center of rotation of the rotary table 17 and the machining starting point of the workpiece W is positioned on the line L1 parallel to the X-axis and tangent to the base circle 24 (FIG. 2) and, for example, by inputting a machining start command from the input device 30. The machining starting point is the end position of the outside wall surface 23 of the wall part 21 and corresponds to the position of the outside wall surface 23 the furthest from the workpiece center of rotation O1.

At step S1, a control signal is output to the spindle motor 31 to drive the tool 14 to rotate by a predetermined speed. At step S2, control signals are output to the X-axis motor 32, Y-axis motor 33, and Z-axis motor 34 to move relatively the tool 14 to the machining start position of the workpiece W and to index the C-axis motor 35 to the machining start rotational angle. The tool 14 is moved relatively so that the center of rotation O2 of the tool 14 is positioned offset from the machining starting point in the −X-axis direction by the amount of the radius r1 of the tool 14.

At step S3, control signals are output to the X-axis motor 32 and C-axis motor 35 to move relatively the tool 14 along the line L1 toward the workpiece center part, that is, the +X-axis direction, while turning the rotary table 17 in the R1 direction (FIG. 2). Due to this, the outside wall surface 23 of the workpiece W is machined. At this time, the rotation amount θ of the workpiece W and the movement amount X of the tool 14 are made to change by a constant ratio, specifically, the relationship of $X = r0 \cdot \theta$ is made to be satisfied, by synchronizing the two. Further, the peripheral speeds at the machining points of the workpiece W are made to become predetermined constant command values by increasing the rotational speed of the rotary table 17 as the distance from the workpiece center O1 to the machining points becomes smaller.

At step S4, it is judged if the center of rotation O2 of the tool 14 has reached a predetermined halfway point on the line L1. If a positive decision is made in step S4, the routine proceeds to step S5, while if negative decision is made, the routine returns to step S3.

At step S5, control signals are output to the X-axis motor 32 and the C-axis motor 35 to move relatively the tool 14 from the workpiece center part along the line L1 in the −X-axis direction while turning the rotary table 17 in the R2 direction opposite to the R1 direction. Due to this, the inside wall surface 22 of the workpiece W is machined while the tool 14 moves relatively by returning along the same path as step S3. At this time, in the same way as step S3, the rotation amount θ of the workpiece W and the movement amount X of the tool 14 are made to change by a constant ratio, by synchronizing the two. Further, the peripheral speeds at the machining points of the workpiece W are made to become predetermined constant command values by decreasing the rotational speed of the rotary table 17 as the distance from the workpiece center O1 to the machining points becomes larger.

At step S6, it is judged if the tool 14 has reached a predetermined machining end point of the workpiece W, that is, if it has reached the end position of the inside wall surface 22 of the wall part 21. If a positive decision is made in step S6, the routine proceeds to step S7, while if a negative decision is made, the routine returns to step S5.

At step S7, predetermined stop processing is carried out. For example, control signals are output to the X-axis motor 32, Y-axis motor 33, and Z-axis motor 34 to move the tool 14 to a predetermined stop position, while control signals are output to the spindle motor 31 and C-axis motor 35 to stop rotation of the tool 14 and rotation of the rotary table 17. After the above, the scroll machining process is ended.

The procedure of the scroll machining method according to the present embodiment may be summarized as follows: First, the workpiece center O1 is aligned with the center of rotation of the rotary table 17. In that state, the workpiece W is fastened to the rotary table 17. Furthermore, commands from the control device 40 are used to rotate the tool 14 and move relatively it to the machining start position (step S1, step S2).

Figure 6:
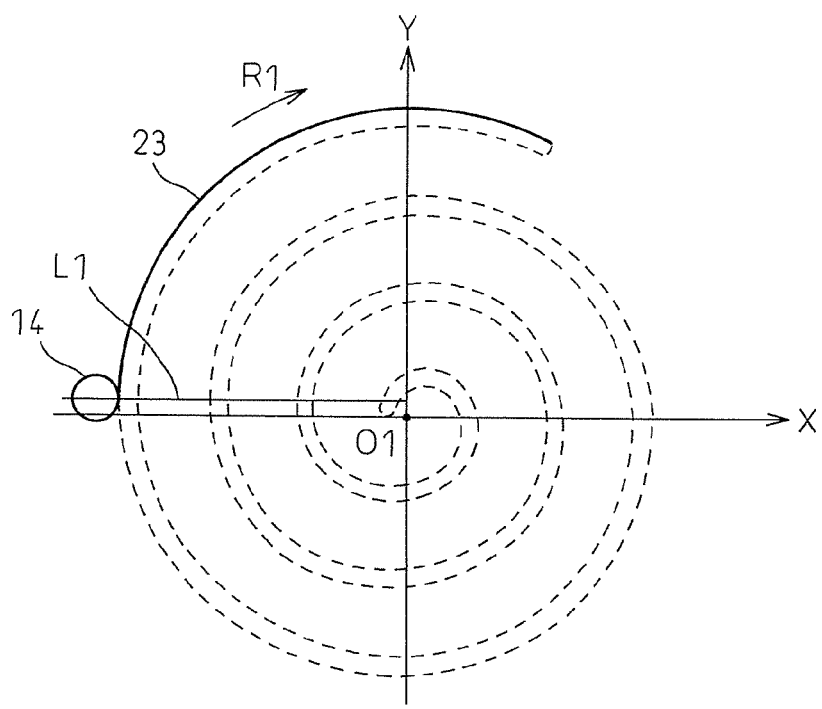
FIG. 6 is a view showing an example of a machining operation of the outside wall surface.
Figure 7:
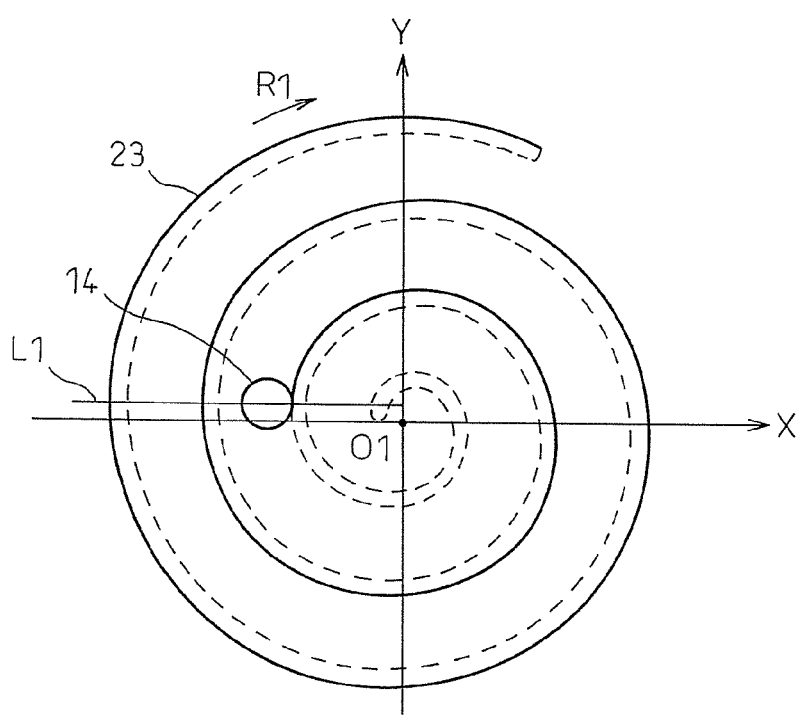
FIG. 7 is a view showing an example of a machining operation of the outside wall surface further advanced from FIG. 6.

Next, the tool 14 is moved relatively in the +X-axis direction along the tangent L1 of the base circle 24 parallel to the X-axis while turning the rotary table 17 in the R1 direction (step S3). Due to this, as shown in FIG. 6 and FIG. 7, the outside wall surface 23 of the wall part 21 is machined from the outside of the workpiece W to the center part 25. In the figure, the portions after machining are shown by the solid lines and the portions before machining are shown by the broken lines. At this time, to make the peripheral speeds at the machining points constant, the rotational speed of the rotary table 17 is made to increase as the distance from the workpiece center O1 to the machining points becomes smaller. Due to this, the roughness of the machined surface can be made uniform.

If the tool 14 approaches the workpiece center O1, the workpiece center part 25 where the outside wall surface 23 and the inside wall surface 22 intersect is machined. At the workpiece center part 25, strictly speaking, there are locations of shapes different from an involute curve, but in the present embodiment, the workpiece center part 25 is also formed by moving relatively the tool 14 along the line L1 in parallel with the X-axis.

Figure 8:
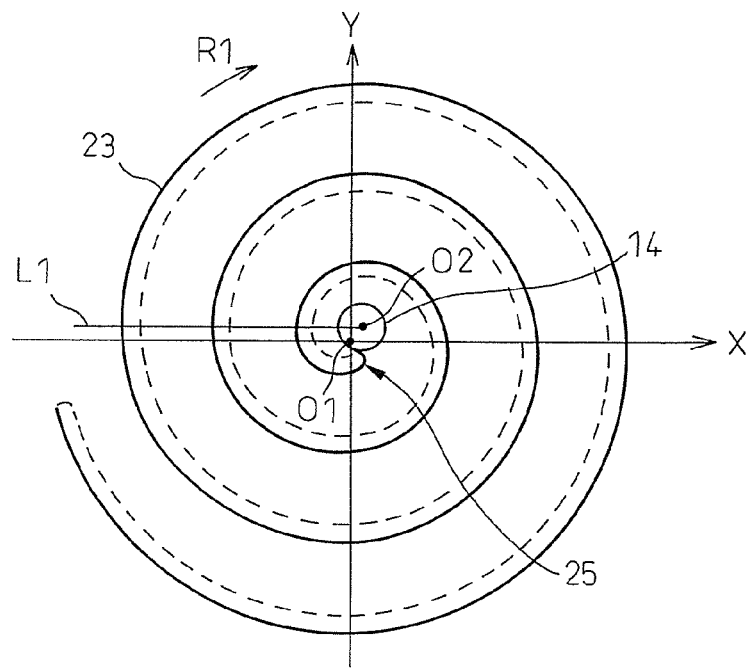
FIG. 8 is a view showing a machining operation at the time a tool reaches a halfway point.
Figure 9:
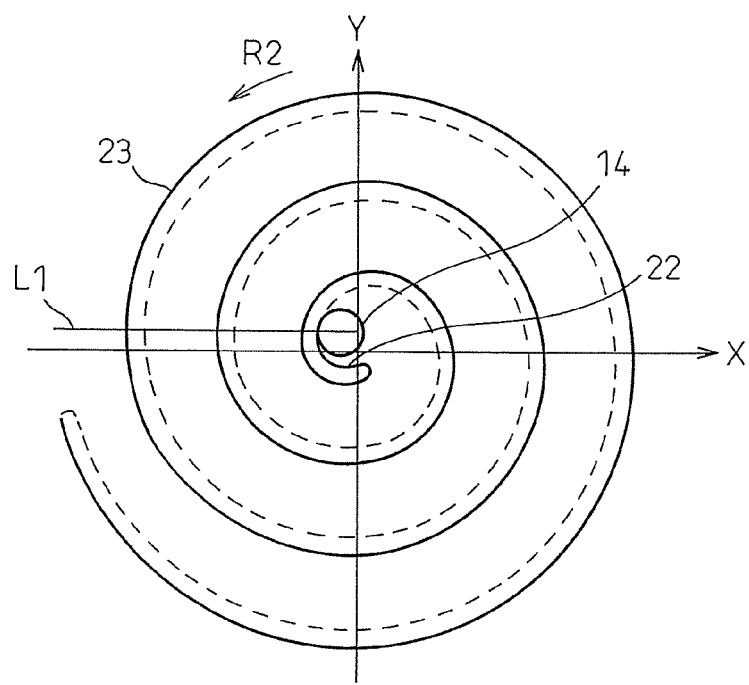
FIG. 9 is a view showing an example of a machining operation of the inside wall surface.
Figure 10:
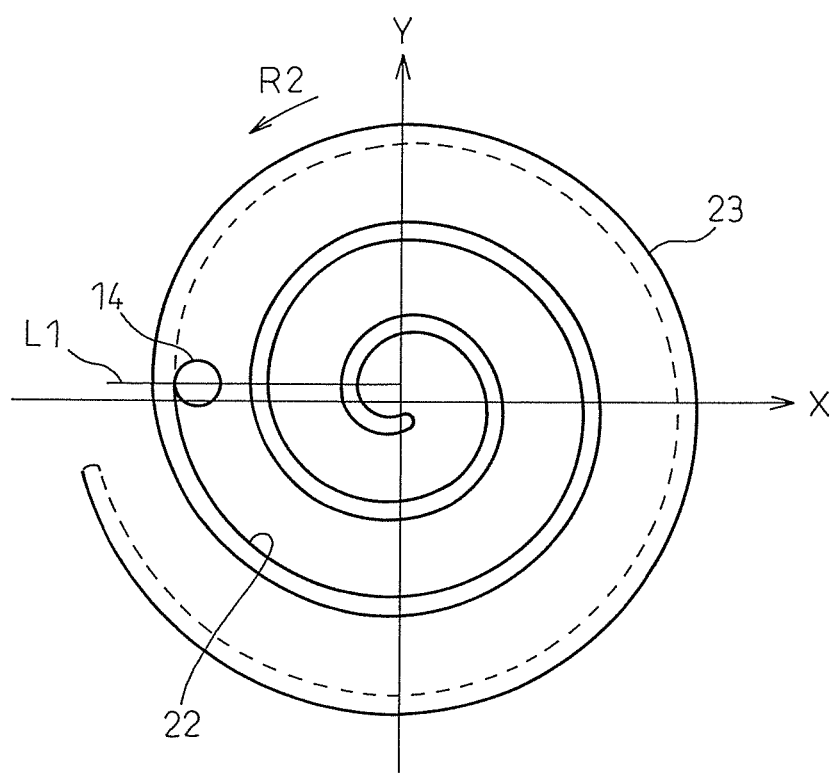
FIG. 10 is a view showing an example of a machining operation of the inside wall surface further advanced from FIG. 9.

As shown in FIG. 8, at the time of machining the workpiece center part 25, if the center of rotation O2 of the tool 14 reaches the halfway point, a control signal is output to the C-axis motor 35 to reverse the direction of rotation of the rotary table 17 and turn the rotary table 17 in the R2 direction. At the same time as this, the tool 14 is made to move relatively in the −X-axis direction through the same path (line L1) as when machining the outside wall surface 23 (step S5). Due to this, as shown in FIG. 9 and FIG. 10, the inside wall surface 22 of the wall part 21 is machined from the center part 25 of the workpiece W to the outside.

Figure 11:
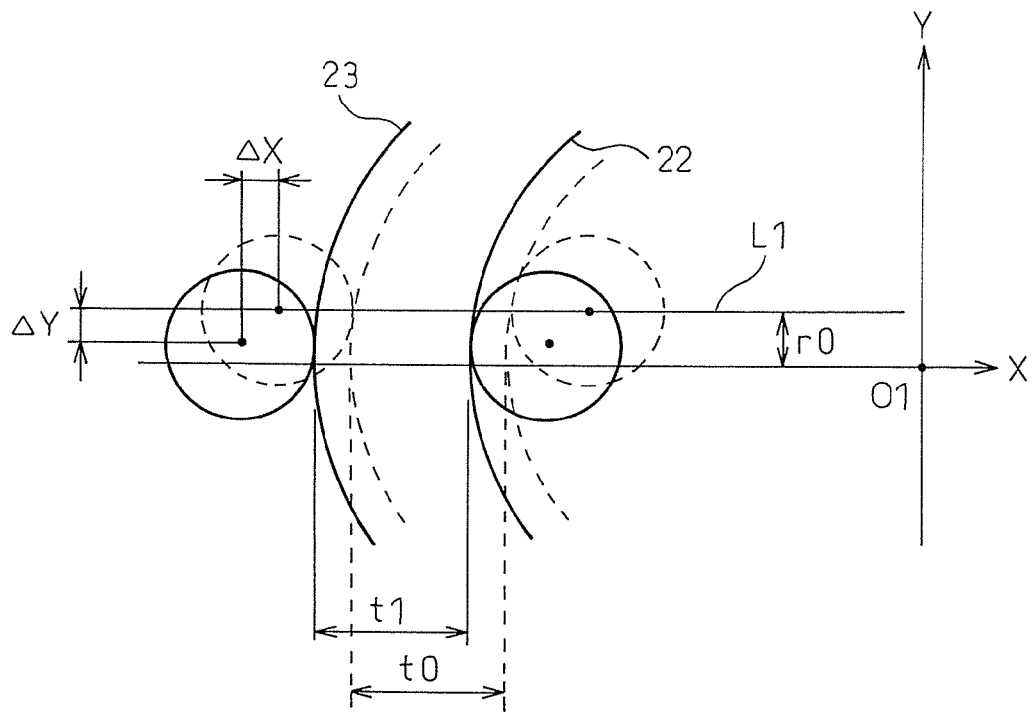
FIG. 11 is a view for explaining an advantageous effect of the scroll machining method according to an embodiment of the present invention.

In this case, the outside wall surface 23 and the inside wall surface 22 are machined inside the same quadrant on the XY plane (second quadrant). For this reason, if there is off-centering of the tool 14 such as shown in FIG. 3, as shown in FIG. 11, the direction of positional deviation of the outside wall surface 23 and the direction of positional deviation of the inside wall surface 22 will become equal. Due to this, the error in thickness of the wall part 21 due to positional deviation of the outside wall surface 23 is cancelled out by the positional deviation of the inside wall surface 22 and the thickness t1 of the wall part 21 can be made substantially equal to the design value t0.

Below, the advantageous effects shown in FIG. 11 will be explained using numerical formulas:

First, the effects of off-centering in the X-axial direction will be explained. In general, an involute curve on the XY plane is expressed by the following formula (I):

$$X\theta = R(\cos\theta + (\theta - \theta 0)\sin\theta) + X0$$

$$Y\theta = R(\sin\theta - (\theta - \theta 0)\cos\theta) + Y0 \qquad (I)$$

Here, if the rotation start angles θ0 of the outside wall surface 23 and the inside wall surface 22 are made θ23, θ22 and the off-centering of the tool center in the X-axis direction is made ΔX, the positions Xθ23, Xθ22 of the outside wall surface 23 and the inside wall surface 22 at the actual machining points are expressed respectively by the following formula (II).

$$X\theta 23 = R(\cos\theta + (\theta - \theta 23)\sin\theta) + \Delta X$$

$$X\theta 22 = R(\cos\theta + (\theta - \theta 22)\sin\theta) + \Delta X \qquad (II)$$

Therefore, if considering the amount of off-centering ΔX in the X-axis direction, the thickness t1 (=Xθ23−Xθ22) of the wall part 21 is expressed by the following formula (III).

$$t1 = R(\theta 22 - \theta 23)\sin\theta \qquad (III)$$

As clear from the above formula (III), the thickness t1 is unaffected by the off-centering θX in the X-axis direction. Therefore, regardless of off-centering in the X-axis direction, the thickness t1 of the wall part 21 can be precisely machined.

As opposed to this, in the example of FIG. 3, the positions Xθ23, Xθ22 of the machining points are expressed by the following formulas (IV).

$$X\theta 23 = -R(\cos\theta + (\theta - \theta 23)\sin\theta) + \Delta X$$

$$X\theta 22 = R(\cos\theta + (\theta - \theta 22)\sin\theta) + \Delta X \qquad (IV)$$

For this reason, the thickness t1 of the wall part 21 becomes the following formula (V). Due to off-centering ΔX in the X-axis direction, error occurs in the thickness t1.

$$t1 = R(\theta 22 - \theta 23)\sin\theta + 2\Delta X \qquad (V)$$

Figure 12:
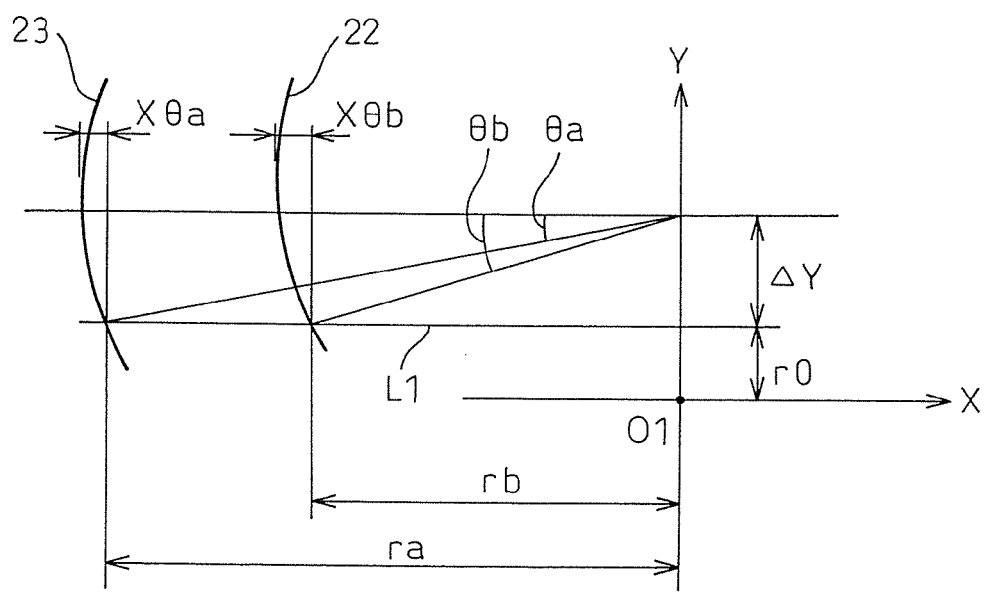
FIG. 12 is a view for explaining an effect given by off-centering of the tool in the Y-axis direction on the thickness of the wall part.

Next, the effects of off-centering in the Y-axis direction will be explained. As shown in FIG. 12, if there is off-centering of ΔY in the Y-axis direction, the positional deviations Xθa, Xθb of the outside wall surface 23 and the inside wall surface 22 are respectively expressed by the following formulas (VI).

$$X\theta a = \Delta Y \tan\theta a$$

$$X\theta b = \Delta Y \tan\theta b \qquad (VI)$$

Here, if the lengths in the X-axis direction from the center of rotation O1 to the machining points (design values) of the outside wall surface 23 and the inside wall surface 22 are respectively ra, rb, the following formula (VII) stands between θa, θb and ΔY.

$$\tan\theta a = \Delta Y/ra$$

$$\tan\theta b = \Delta Y/rb \qquad (VII)$$

Due to the above, if considering the off-centering in the Y-axis direction, the thickness t1 (=Xb−Xa) of the wall part 21 is expressed by the following formula (VIII).

$$t1 = \Delta Y(\tan\theta b - \tan\theta a) \qquad (VIII)$$

$$= (\Delta Y^2/(ra \cdot rb)) \cdot (ra - rb)$$

In the above formula (VIII), ΔY is much smaller than ra, rb, so $\Delta Y^2/(ra \cdot rb)$ becomes substantially 0. For this reason, the off-centering in the Y-axis direction has almost no effect on the thickness t1 of the wall part 21.

According to the present embodiment, the following functions and effects can be obtained.

(1) The tool 14 is moved relatively along the tangent L1 of the base circle 24 in the +X-axis direction while turning the rotary table 17 in the R1 direction to machine the outside wall surface 23 of the wall part 21 (first scroll machining step), while, furthermore, the tool 14 is moved relatively along the tangent L1 in the −X-axis direction while turning the rotary table 17 in the R2 direction to machine the inside wall surface 22 of the wall part 21 (second scroll machining step). Due to this, it is possible to machine the wall part 21 precisely to the desired thickness t0 without off-centering of the tool 14.

(2) The rotational speed of the rotary table 17 is controlled in accordance with the distance from the workpiece center O1 to the machining points so that the peripheral speeds of the workpiece W at the machining points of the outside wall surface 23 and the inside wall surface 22 of the wall part 21 become constant, so it is possible to form a machined surface of a uniform surface quality over the entire region of the outside wall surface 23 and the inside wall surface 22 of the wall part 21.

(3) Between the machining of the outside wall surface 23 and the machining of the inside wall surface 22, the workpiece center part 25 is machined (center part machining step). Due to this, the wall part 21 of the scroll shape can be efficiently formed by continuous machining.

(4) From the start of to the end of the machining, the tool 14 is moved relatively in only the X-axis direction, so the operation of the machine tool 10 is simple and the scroll shape can be precisely machined.

In the above embodiment, the explanation is given of the case of machining a scroll shape determined by an involute curve. However, the machining method of the present invention can be similarly applied to machining of other scroll shapes as well. Therefore, the path of relative movement of the tool 14 is not limited to the line L1 parallel to the X-axis. That is, so long as including a step of moving relatively the tool 14 from the outside of the workpiece W toward the center part along a predetermined path while turning the rotary table 17 in a first direction R1 so as to machine one of the outside wall surface 23 and the inside wall surface 22 (first scroll machining step) and a step of moving relatively the tool 14 from the center part of the workpiece W toward the outside by returning along the predetermined path while turning the rotary table 17 in a second direction R2 opposite to the first direction so as to machine the other of the outside wall surface 23 and the inside wall surface 22 (second scroll machining step), the scroll machining method of the present invention is not limited to the one described above.

For example, after the scroll machining is finished once, the thickness t1 of the wall part 21 may be measured (measurement step), if there is deviation from the design value t0, the radius r1 of the tool 14 may be corrected by the amount of that deviation (correction step), and subsequent scroll machining may be carried out under those conditions. That is, according to the scroll machining method of the present invention, the error in the thickness t1 due to off-centering of the tool 14 is eliminated, so if there is an error in the thickness t1, it may be considered to be an error in the tool size. For this reason, by correcting the tool size by the amount of that error and moving relatively the tool 14 in the X-axis direction, it is possible to precisely machine the thickness t1 of the wall part 21 even if there is variation in tool size.

In the above embodiment, the tool 14 is moved along the line L1 to machine not only the outside wall surface 23 and the inside wall surface 22, but also the center part 25 of the workpiece W. However, the center part 25 may have various shapes, so depending on the shape of the center part 25, it is also possible to move relatively the tool 14 along a path separate from the line L1 and machine the center part 25. The center part machining step is not limited to the one described above. The center part 25 means a predetermined region which straddles a boundary point between the inside wall surface 22 and the outside wall surface 23. The shape of the center part 25 includes an arc, straight line, or other shape other than an involute curve.

In the above embodiment, the C-axis motor 35 is used to turn the rotary table 17, and the X-axis motor 32, Y-axis motor 33, and Z-axis motor 34 is used to move relatively the tool 14 relative to the workpiece W. However, the configurations of the first driving portion and second driving portion are not limited to the ones described above. The configuration of the control portion constituted by the control device 40 is also not limited to the one described above.

According to the present invention, the tool is moved relatively along a predetermined path while turning the rotary table in a first direction and the tool is moved relatively by returning along the same path while turning the rotary table in a second direction, so the inside wall surface and the outside wall surface are machined at the same regions with respect to the center of rotation and the thickness of the wall part can be precisely machined.

REFERENCE SIGNS LIST 10 machine tool
14 tool
17 rotary table
21 wall part
22 inside wall surface
23 outside wall surface
32 X-axis motor
33 Y-axis motor
34 Z-axis motor
35 C-axis motor
40 control device

The invention claimed is:

1. A scroll machining method for forming a wall part configured on a scroll shape on a surface of a workpiece, in which a tool attached to a spindle is moved relative to the workpiece attached to a rotary table, comprising:
   a first scroll machining step of machining one of an outside wall surface and an inside wall surface of the wall part, in which the tool is moved relative to the workpiece from an outside of the workpiece toward a center part along a predetermined path while turning the rotary table in a first direction;
   a second scroll machining step of machining the other of the outside wall surface and the inside wall surface of the wall part, in which the tool is moved relative to the workpiece from the center part of the workpiece toward the outside by returning along the predetermined path while turning the rotary table in a second direction opposite to the first direction;
   a measurement step of measuring a thickness of the wall part after the first scroll machining step and the second scroll machining step are finished; and
   a correction step of correcting a tool radius by an amount of a deviation between a measured value measured in the measurement step and a design value of the thickness of the wall part, for a subsequent first scroll machining step and a subsequent second scroll machining step.

2. The scroll machining method according to claim 1, wherein the first scroll machining step and the second scroll machining step include increasing a rotational speed of the rotary table as a distance from the center part of the workpiece to machining points of the outside wall surface and the inside wall surface of the wall part becomes smaller and decreasing the rotational speed of the rotary table as the distance from the center part of the workpiece to the machining points becomes greater, so that peripheral speeds of the workpiece at the machining points are constant.

3. The scroll machining method according to claim 1, further comprising:
   a center part machining step of machining the center part of the workpiece, in which the tool is moved relative to the workpiece while turning the rotary table, after the first scroll machining step and before the second scroll machining step.

4. The scroll machining method according to claim 3, wherein the scroll shape is determined by an involute curve, and in the first scroll machining step, the second scroll machining step, and the center part machining step, the tool is moved relative to the workpiece along one tangent line of a base circle of the involute curve.

5. A machining unit comprising:
   a first driving portion turning a rotary table to which a workpiece is attached;
   a second driving portion moving a tool attached to a spindle relative to the rotary table;
   a control portion controlling the first driving portion and the second driving portion, so that when in a first scroll machining one of an outside wall surface and an inside wall surface of a wall part configured in a scroll shape is machined, the tool is moved relative to the workpiece from an outside of the workpiece toward a center part along a predetermined path while the rotary table turns in a first direction and so that when in a second scroll machining the other of the outside wall surface and the inside wall surface of the wall part is machined, the tool is moved relative to the workpiece from the center part of the workpiece toward the outside by returning along the predetermined path while the rotary table turns in a second direction opposite to the first direction; and
   a measurement portion measuring a thickness of the wall part after the first scroll machining and the second scroll machining are finished;
   wherein a tool radius is corrected by an amount of a deviation between a measured value measured by the measurement portion and a design value of the thickness of the wall part, for a subsequent first scroll machining and a subsequent second scroll machining.

* * * * *